United States Patent

Seelbinder

[15] 3,700,335
[45] Oct. 24, 1972

[54] PROCESS AND APPARATUS FOR SENSITOMETRICALLY TESTING A LIQUID, PHOTOSENSITIVE EMULSION

[72] Inventor: David C. Seelbinder, Penfield, N.Y.

[73] Assignee: Eastman Kodak Company, Rochester, N.Y.

[22] Filed: Jan. 21, 1971

[21] Appl. No.: 108,485

[52] U.S. Cl..................356/201, 23/230 R, 250/218, 356/203, 356/205
[51] Int. Cl. ..........................................C01n 21/22
[58] Field of Search......356/201, 203, 204, 205, 206, 356/208; 250/218; 23/230 R

[56] References Cited

UNITED STATES PATENTS

| | | | |
|---|---|---|---|
| 2,590,830 | 3/1952 | Williford et al........356/208 X |
| R23,023 | 8/1948 | Wolf et al. ............356/206 X |
| 2,979,385 | 4/1961 | Karasek et al. ........356/206 X |
| 3,019,091 | 1/1962 | Schneider, Jr. ........356/181 X |
| 3,049,412 | 8/1962 | Akhtar..................356/181 X |
| 3,518,000 | 6/1970 | Truchelut..............356/204 X |
| 3,096,137 | 7/1963 | Silard...................356/201 X |

*Primary Examiner*—Ronald L. Wibert
*Assistant Examiner*—F. L. Evans

*Attorney*—Robert W. Hampton, Paul R. Holmes and Lloyd F. Seebach

[57] ABSTRACT

A continuous process and system for measuring and relating the densities of a liquid photographic emulsion to determine its sensitivity. A test sample of the emulsion is diluted with a fixed amount of water before being moved and circulated in a predetermined flow path. A densitometer and sensitometer are arranged in the flow path, and the unexposed emulsion is first introduced into the densitometer so as to measure the density thereof, before processing, and then into the sensitometer in which the emulsion is exposed to radiation of continually varying intensity and of selected spectral quality. After being exposed, the emulsion is mixed with a suitable processing solution; and the processed emulsion is then returned to the densitometer wherein the density is again measured. A recorder plots a graph representative of the density measurements so that the sensitivity of the emulsion can be determined. The process and apparatus is continuous in its operation and sequence of operation through the medium of a program-control medium. Such a medium and its associated electronic circuitry provides the necessary control for actuating the various valves, pumps and other elements of the system in proper time and sequence to effect a complete and fully automatic emulsion testing device.

27 Claims, 7 Drawing Figures

Patented Oct. 24, 1972

DAVID C. SEELBINDER
INVENTOR.

BY

AGENT

Patented Oct. 24, 1972

DAVID C. SEELBINDER
INVENTOR.

BY Lloyd F. Seebach

AGENT

Patented Oct. 24, 1972

DAVID C. SEELBINDER
INVENTOR.

BY *[signature]*

AGENT

Patented Oct. 24, 1972

DAVID C. SEELBINDER
INVENTOR.

BY

AGENT

3,700,335

PROCESS AND APPARATUS FOR SENSITOMETRICALLY TESTING A LIQUID, PHOTOSENSITIVE EMULSION

FIELD OF THE INVENTION

This invention relates to a process and apparatus for continuously measuring the densities of a liquid photosensitive emulsion, both before and after processing, so as to more closely control the sensitivity characteristics of the emulsion prior to application thereof to a support.

DESCRIPTION OF THE PRIOR ART

In the manufacture of photographic films and papers, a photosensitive emulsion is usually prepared in a batch form, is then coated on a suitable base or support, such as a transparent or opaque film, paper, glass or other suitable material, and is allowed to dry on the base. In preparing a batch of emulsion, the photographic characteristics of the emulsion can be altered or even changed by numerous variables which are encountered in the course of manufacture. In order to ensure uniform quality and uniform sensitivity of a batch of emulsion for making a particular type of photographic film or paper, it is generally the practice to remove a number of test strips from the photographic film, paper or support after the emulsion has been applied thereto and allowed to dry. These test strips are then subjected to various exposures, developed, washed, and dried. The emulsion is then measured in a densitometer by means of reflected or transmitted light to determine its opacity or density. The characteristics of the emulsion can be determined from such tests and the sensitivity of the emulsion is usually shown by plotting the density against log exposure to obtain a curve which is representative of that particular emulsion. A great deal of time is required to consummate such tests and, in addition, the particular batch of emulsion must be stored until the tests have been made to determine whether, after such tests, any change must be made in the batch and/or whether the batch of emulsion is in accordance with the sensitivity requirements of the film for which it is intended.

SUMMARY OF THE INVENTION

It is an object of the invention to provide a process and apparatus which can be placed in a photographic emulsion production line and which is program-controlled for continuously testing a liquid sample of the emulsion to determine its sensitometric characteristics.

Another object of the invention is to provide a process and apparatus for testing a liquid photographic emulsion to determine its sensitometric characteristics in which the density of the emulsion before processing is related to the density thereof after processing.

Still another object of the invention is to provide a process and apparatus for testing a liquid photographic emulsion in which a test sample is taken periodically from an emulsion line and continuously tested to determine its sensitometric characteristics in a fully automatic, program-controlled, sequence of operations.

Yet another object of the invention is to provide a process and apparatus for testing a liquid photographic emulsion in which a test sample of the emulsion is continually subjected to radiation of variable intensity with a high degree of accuracy, whereby a wide range of conditions under which the emulsion might be exposed is accurately reproduced.

Other objects and advantages of the invention will be apparent to those skilled in the art by the detailed description which follows.

The above objects and advantages of the invention are attained in a continuous process and system for measuring and relating the densities of a liquid photographic emulsion to determine its sensitivity. A test sample of the emulsion is removed from the line and diluted with a fixed amount of water before being moved and circulated in a predetermined flow path. A densitometer and sensitometer are arranged in the flow path, and the unexposed emulsion is first introduced into the densitometer so as to measure the density thereof, before processing, and then into the sensitometer in which the emulsion is exposed to radiation of continually varying intensity and of selected spectral quality. After being exposed, the emulsion is mixed with a suitable processing solution; and the processed emulsion is then returned to the densitometer wherein the density is again measured. The system is continuous in that the densitometer is provided with two measuring stations, one for the unprocessed and the other for the processed emulsion. Each station in the densitometer is illuminated with a source of infrared radiation. The radiation that is transmitted by the emulsion in each station is converted into electrical signals by a photosensitive detector, the amplitude of the signals being in accordance with the transmitted radiation. The signals generated by the detector are obtained by alternately energizing the infrared source of illumination in each station at a fixed rate so that the emulsion in both its processed and unprocessed form are, in effect, measured continuously and, in effect, simultaneously. The signals generated by the detector in response to the transmitted radiation from each station are used, after suitable amplification, timing, etc., to actuate a recorder which plots a graph representative of the density measurements derived from each station so that the sensitivity of the emulsion can be determined. The process and apparatus is continuous in its operation and sequence of operation through the medium of a program-control tape. This tape with its reader and associated electronic circuitry provides the necessary signals for actuating the various valves, pumps and other elements of the system in proper time and sequence to effect a complete and fully automatic emulsion testing device.

DESCRIPTION OF THE DRAWINGS

Reference is now made to the accompanying drawings wherein like reference numerals and characters designate like parts and wherein.

DESCRIPTION OF THE PREFERRED EMBODIMENT

The method and apparatus for the present invention will first be described with respect to the testing of a liquid, silver halide emulsion, and the variations in the process and apparatus for testing a color-forming emulsion will be described thereafter.

Figure 1:
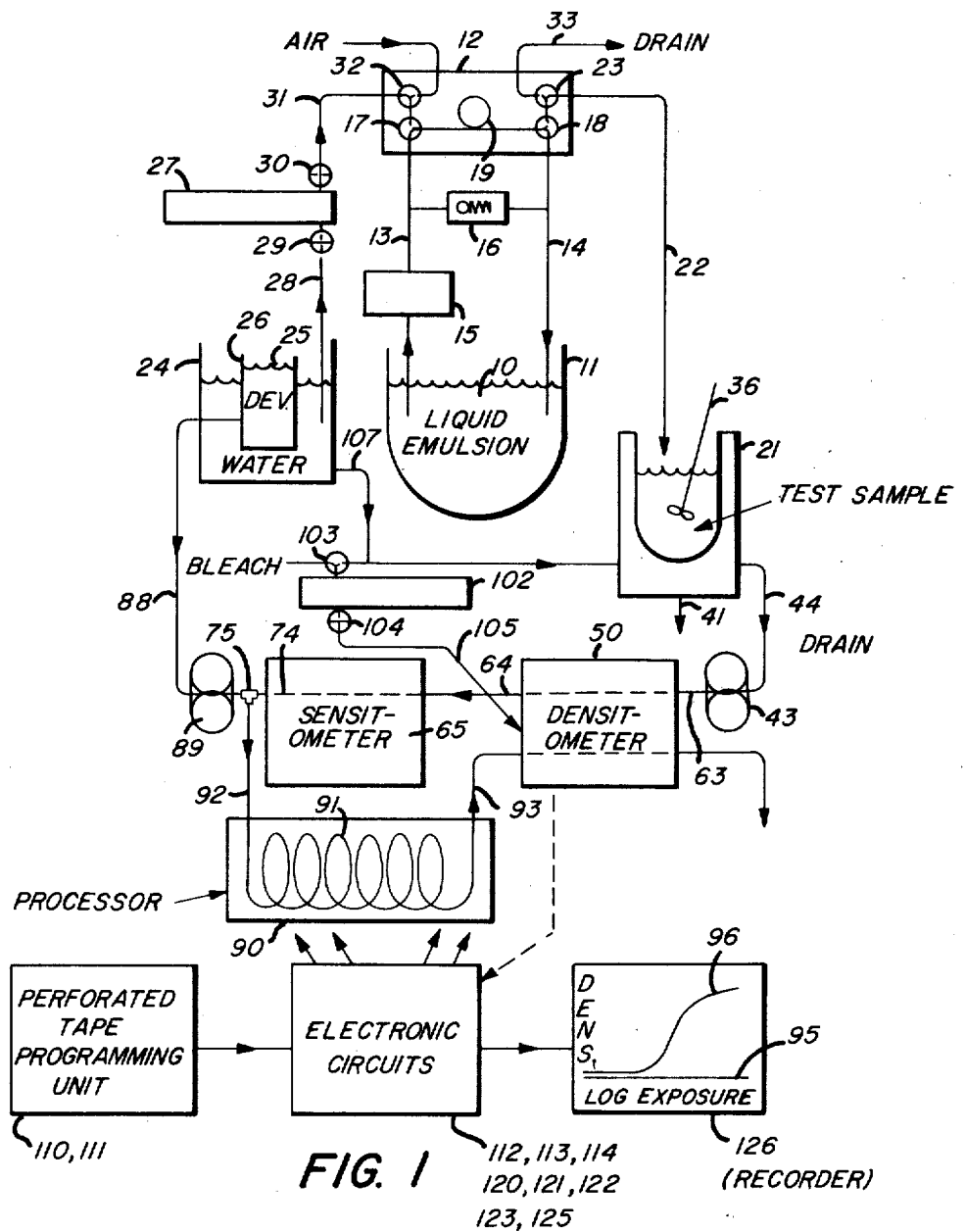
FIG. 1 is a schematic view showing the general arrangement of the apparatus and particularly the flow path through which the emulsion is circulated for making the density and sensitivity measurements.

With particular reference to FIG. 1, an emulsion 10 is mixed and retained in a kettle 11 from which it can be pumped to a coating device which applies the emulsion as a layer to a suitable support or base in a well-known manner. However, such coating process and/or apparatus forms no part of the present invention; and no further reference will be made thereto. A sampler designated by the numeral 12 is connected by lines 13 and 14 to the emulsion in the kettle 11, the emulsion being circulated through the sampler 12 continuously by means of a pump 15. A spring-loaded valve 16 is connected in parallel with the sampler 12 to control the fluid pressure and flow rate in the sampler. The amount of the emulsion that is used as a test sample is determined by the internal volume of each of valves 17 and 18 and the loop 19 arranged between these valves. The test sample is introduced into the mixer 21 via line 22 which is connected to a valve 23 in the sampler. As shown in FIG. 1, each of the valves 17 and 18 is in a full line position and in this position they provide a continuous flow path for the emulsion from and to the kettle 11.

To obtain a test sample, valves 17 and 18 are switched simultaneously to a dotted line position, thereby trapping a fixed amount of emulsion between the valves 17 and 18 and including the loop 19. The test sample is flushed into mixer 21 with a fixed quantity of water that is derived from tank 24 and used to maintain the developer solution 25 in tank 26 at the proper temperature. The amount of water removed from tank 24 is measured by pump 27. The pump 27 is connected by line 28 to the water in tank 24. When valve 29 is open, valve 30 is closed; and the pump 27 then draws a metered amount of water into the pump. Valve 29 is then closed and valve 30 is opened when valves 17 and 18 are switched to their dotted line positions. At this time, the fixed quantity of water in pump 27 will be moved through valve 30, line 31 and valves 32 and 17 to flush the test sample of the emulsion through valves 18 and 23 and line 22 into mixer 21. When this has been accomplished, valves 29 and 30 return to their original positions and valves 23 and 32 move into their dotted line positions so the valves and lines can be cleaned by the air introduced into valve 32 so as to remove any remaining water and emulsion via the drain line 33. Valves 17, and 18, 23 and 32 then return to their original position and emulsion 10 is again circulated through the loop 19. With valve 30 closed and the valve 29 opened, another fixed quantity of water will be drawn into and stored in pump 27, the valves then being reversed and conditioned for the next test sample.

The test sample that is flushed into the mixer 21 is diluted and uniformly dispersed in the flushing water by means of stirring rod 36. Dilution of the test sample is about 2 percent, but this value can be varied over a wide range. While the diluted sample is being prepared in the mixer 21, the valve stem 37 is located in such a position that port or opening 38 is midway between ports 39 and 40. In this position the valve stem 37 prevents leakage of the sample to the drain line 41. When the diluted test sample has been mixed and uniformly dispersed in the water, air under pressure is applied to port 42 and the valve stem 37 is moved to the right so that port 39 is aligned with port 38. In this position the test sample of emulsion flows from the mixer 21 to a metering pump 43 via line 44, see FIG. 1. A key 45 prevents valve stem 37 from rotating and maintains the ports 39 and 40 in proper alignment with the port 38. The metering pump 43 moves the test sample of emulsion that is released from the mixer 21, into the densitometer, generally designated by the numeral 50, and through a predetermined flow path at a continuous and predetermined constant rate of flow movement. Mixer 21 is provided with cavities in which heated water is circulated to keep the emulsion and diluent at the proper temperature.

Figure 3:
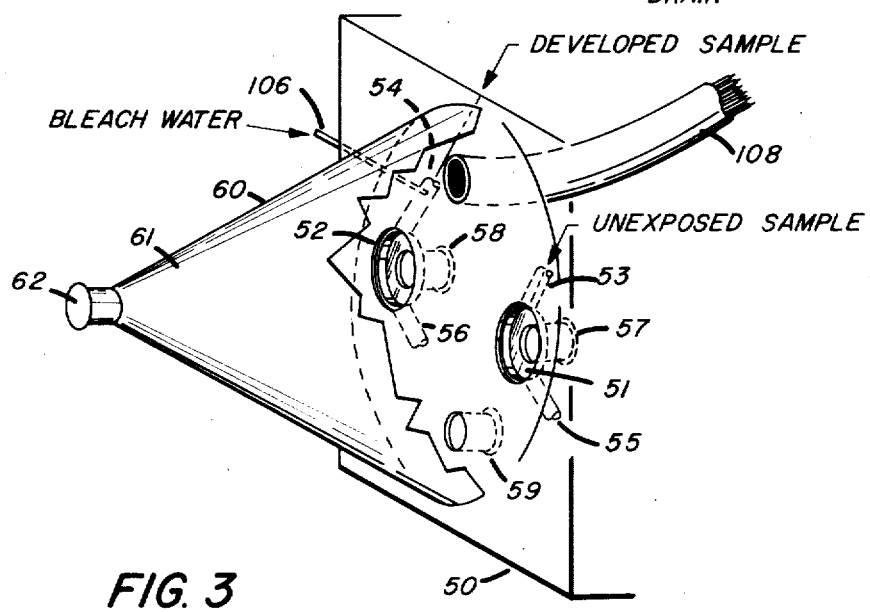
FIG. 3 is a detailed perspective view of the densitometer showing the cells through which the unprocessed and processed samples of emulsion are circulated for measuring the density thereof.

The densitometer 50, see FIG. 3, comprises a cell 51 and a cell 52 through each of which the test sample of emulsion is moved. Each of cells 51 and 52 have transparent faces of glass or a suitable plastic and are provided with an inlet 53 and 54 and an outlet 55 and 56, respectively. A source of infrared radiation 57 is arranged relative to one side of cell 51 and a source of infrared radiation 58 is arranged relative to the corresponding one side of cell 52. A reference source of infrared radiation 59 is also positioned between the cells 51 and 52. A conical shield 60, which encloses the cells 51 and 52, as well as the reference source 59, has mounted at the apex end 61 thereof a radiation detector 62. The inner surface of the shield 60 is coated with a spectrally neutral and highly reflective material, so the radiation transmitted through the cells 51 and 52 or directly from reference source 59 will be generally incident on the detector 62. The inlet 53 is connected to line 63 of pump 43 and the outlet 55 is connected via line 64 to a sensitometer generally designated by the numeral 65. As a result, the test sample is moved through cell 51 at a constant rate and its density measured before it is processed. The interaction of the cells 51 and 52 will be described in detail hereinafter.

Figure 4:
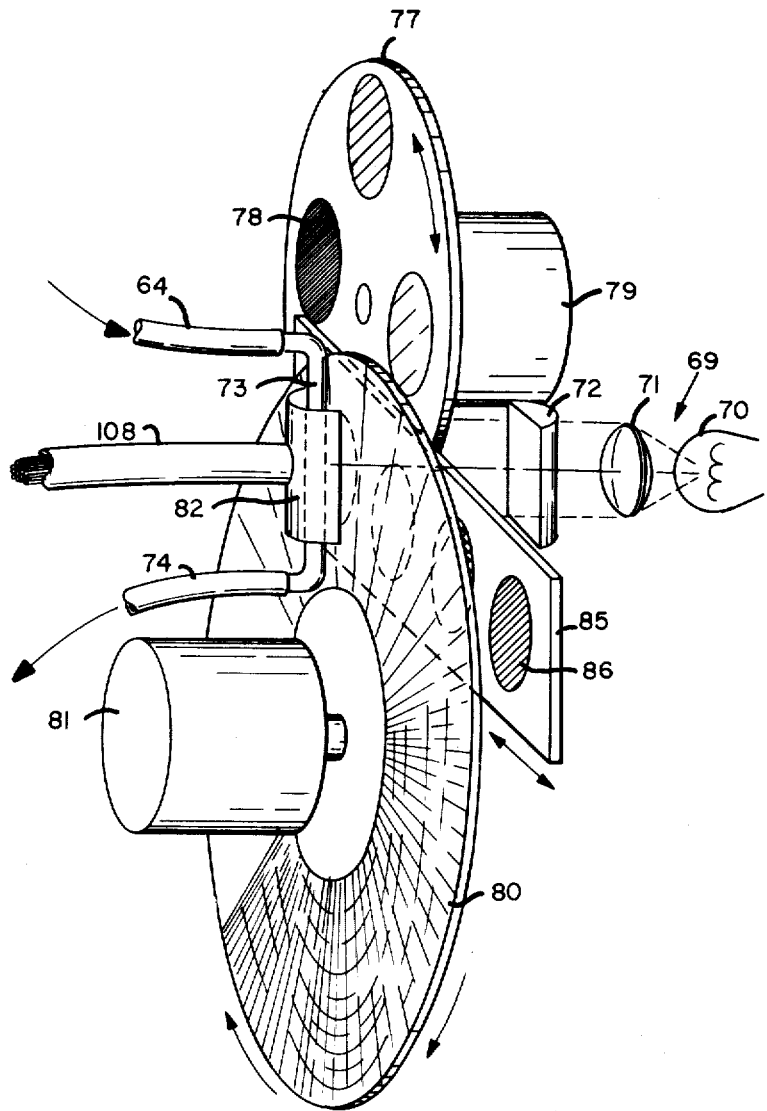
FIG. 4 is a detailed perspective view showing the various filter arrangements that are used to control the intensity and spectral quality of the radiation incident on the emulsion for the purpose of exposure.

The sensitometer 65 includes a system 69 for providing exposure radiation which comprises a tungsten lamp 70 for providing polychromatic light, a lens 71 and a cylindrical lens 72. This illuminating system 69 focuses a line of light on the glass exposing tube 73 through which the test sample continuously flows. The glass tube is connected at one end to line 64 and at the other end to line 74, which is connected to a mixing tee 75, see FIG. 4. A disc 77 is arranged between tube 73 and cylindrical lens 72 and carries a plurality of neutral density filters 78, each of which has a different light transmittance factor. The disc 77 is rotatable by means of an incremental stepping motor 79 to position any one of filters 78 in alignment with the illuminating system. A disc 80 is also arranged between tube 73 and disc 77 and consists of a coating of a spectrally neutral transmittance material on a glass support. The disc 80 is rotated in increments by means of a stepping motor 81. The transmittance factor of the material on disc 80 varies in an approximately logarithmic linear manner with angular rotation of the disc. The disc 80 is programmed to be rotated so that the continuously flowing test sample receives an exposure of continually varying intensity such that the logarithmic intensity varies linearly with time. The programmed rotation of disc 80 is such that its average angular velocity is nonlinear with time to compensate for any undesired, nonlinear relationship that might exist between the energy transmitted by the disc with respect to its angular displacement, thereby imparting a desired and precise rate of change of log exposure for the test sample. Since the test sample is pumped at a constant rate and tube 73 is of generally uniform internal cross section, log exposure (log intensity times time) varies linearly with time. The filters carried by disc 77 can be interposed in the light path so as to alter the range of intensity incident on the test sample in tube 73 when combined with disc 80. The disc 77 can also serve as an opaque shutter so that the test sample receives no exposure to light. When this condition is desired, disc 77 is rotated into a position such that an opaque portion of the disc such as that between any two of filters 78 is interposed in the light path. In order to improve exposure uniformity, a spectrally neutral diffuse reflector 82 can be positioned behind tube 73 as shown in FIG. 4.

In addition to controlling the intensity of the light incident on the test sample for exposure thereof, the spectral quality of the light can also be controlled. This is accomplished by a slide 85 that is arranged between discs 77 and 81 for selectively positioning one of a plurality of color filters 86 in alignment with the illuminating system 69 to control the spectral quality of the exposing radiation. A clear aperture can be included to permit exposure with the light which emanates directly from lamp 70 and controlled only as to intensity by one or both of filters 78 and disc 80.

After being exposed in the sensitometer 65, the test sample of emulsion is moved through line 74 to mixing tee 75 wherein it is mixed with a processing or developing solution 25 that is drawn from tank 26 via line 88 by metering pump 89. The processing solution 25 is pumped continuously and at a constant rate by pump 89. A portion of the test emulsion is chemically reduced to metallic silver by the processing solution as a function of its intrinsic sensitivity, exposure, processing time, temperature, and environmental factors within the processor 90. The processor 90 consists of a coil 91 of tubing having a length and cross-section selected to give a fixed, predetermined time of association of developer and emulsion between the tee 75 and the densitometer cell 52, see FIG. 3. The one end of processor 90 is connected via line 92 to tee 75, and the other end is connected to the inlet 54 of cell 52 via line 93.

The operation of the system can be best understood will respect to the disclosure in FIG. 3. As pointed out above, the test sample of emulsion is flowing continuously through a predetermined flow path for measuring as defined by the connections between the mixer 21, pump 43, densitometer 50, sensitometer 65, processor 90 and by return to the densitometer 50. The process is started by flowing the test sample through cell 51 and, after exposure and processing, flowing the processed test sample through cell 52. Once the process is under way, unexposed and unprocessed or undeveloped emulsion will be moving through cell 51 and processed or developed emulsion will also be moving through cell 52. By means to be described hereinafter, infrared sources 57, 58, and 59 are switched on and off in sequence so that the detector 61 picks up the radiation transmitted through cell 51, cell 52, and from the source 59 in a periodic and repetitive order. The radiation incident on the detector 62 at any one instant is, therefore, representative of the radiation transmitted through the emulsion sample in the respective cell whose infrared source is energized at such instant. The signals that are generated by detector 62 are properly timed and oriented by circuitry so that the measured density of the test sample is associated with the proper one of cells 51 and 52 and a trace 95 of the density before processing and a trace 96 of the densities after processing are graphically recorded in a related manner. The trace 96 is a plot of density vs. log exposure and is representative of the sensitivity of the emulsion having a density level as shown by the reference plot 95. In this way the test sample of the emulsion is continuously measured before and after processing.

It should be pointed out that the density of the test sample before processing is recorded as a function of time. The cross section and configuration of the lines in the system through which the emulsion flows, as well as the flow rate, as controlled by the metering pump 43, are chosen to prevent significant alterations in the flow through the cell 52 of the log linear relationship between exposure and time imparted to the emulsion in the sensitometer. As a result, the trace 96 is, therefore, plotted as density vs. log exposure.

Preferably, only one sample need be tested; however, if necessary, a number of samples can be drawn from the emulsion batch 10 and tested so a comparison can be made. After each test, the valve stem 37 is moved to the left by applying compressed air to port 97. The valve stem moves to the left until port 40 is aligned with port 38. When in this position, any unused emulsion can drain from the mixer 21 via line 41. At the same time, port 39 is aligned with a water supply port 98, which has an elongated portion 99 at its intersection with the bore 100 in which the stem 37 moves, thereby resulting in a switch in the solution applied to the metering pump 43. Upon completion of drainage of the mixer, the air pressure applied to port 97 is reduced and valve stem 37 moves partially to the right until the pressure on spring 101 is relieved. At this static condition, port 39 will still be aligned with portion 99 so that water is continuously supplied to the metering pump 43, port 38 being closed by stem 37 so that a new sample can be prepared as previously described. In this manner the system can be operated continuously, even though the diluted test samples are prepared on a batch or intermittent basis.

The reduced metallic silver complexes in the emulsion accumulate on the transparent plates of cell 52. This accumulation is removed between samples to prevent build-up of significant error in the density measurements. During part of the time that water is introduced into and circulated through the system via mixer port 98 and pump 43, a bleach is introduced by pump 102 into the cell 52 via valves 103 and 104, line 105 and a capillary tube 106 to clean the cell windows. Water is then drawn from tank 24 when valve 103 is switched via line 107, valve 103, pump 102, valve 104 and line 105 to clean the tube 106 and to prevent bleach contamination of subsequent emulsion test samples. After bleaching, while water is still flowing through cell 52, the zero density calibration of the cell can be electronically checked and reset if necessary. In a like manner, the calibration of cell 51 can be checked at the appropriate time when water is flowing through it. Metallic silver complexes which accumulate within the processor 90 do not effect the processing and are removed on a periodic basis, when convenient, by introducing bleach into the mixer.

Periodic intercomparison calibration checks of the densitometer and sensitometer performances can be made with a bundle of fiberoptics 108 that interconnects the reflector 82 with the densitometer 50 as shown in FIGS. 3 and 4.

For such a calibration check a special program tape is used which controls the rotation of disc 80 so the radiation transmitted through the bundle of fiberoptics 108 to the densitometer 50 varies in intensity logarithmically with time. The transmitted radiation is incident on detector 62 which produces electrical signals that are utilized by recorder 126 to produce a corresponding trace. This trace is compared to a standard trace to denote any variation in densitometer performance. The sensitometer illuminance characteristics can be checked by using the densitometer as a photometer, the bundle of fiber-optics 108 being connected as above. In this case, the transmitted radiation is read as relative radiation of the source 70 with and without spectral attenuation by the filters 86.

Figure 5:
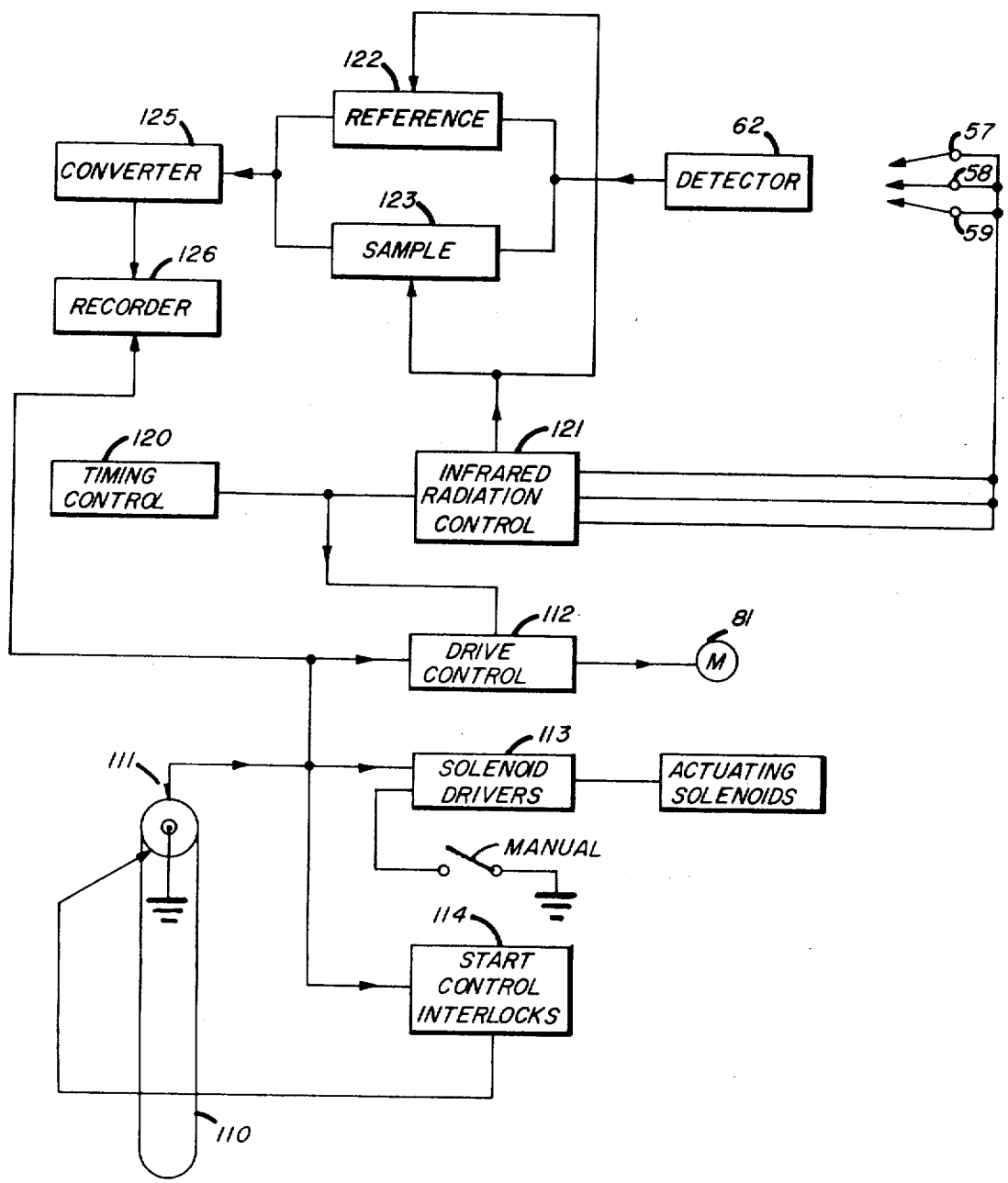
FIG. 5 is a block diagram showing the manner in which the various elements of the system are responsive to a program-control tape, whereby the process is made completely automatic and continuous in operation.

With reference to FIG. 5, the timing sequence of operation and control of the various elements in the system which makes the process fully automatic is programmed by a multiple track perforated program tape 110. Other mediums, such as a magnetic tape, an output from a computer, etc. can also be used as a program control. The program tape 110 is moved at a constant rate past a plurality of sensing heads or fingers 111 that will correspond in number to the tracks which, in turn, will correspond in number to the elements to be controlled and/or actuated. As is well known in such programming art, the tape 110 is provided with a number of longitudinal tracks in the form of slots or slits which are of a length for maintaining an operating member, such as a switch, valve, or motor operative or inoperative for a period of time corresponding to the length of its respective control slot. The signals derived from the finger or fingers 111 are transmitted to respective circuitry 112 for controlling motor 81, to solenoid driver circuitry, indicated by the numeral 113, for operating the various solenoids controlling actuation of pumps 15, 27, 43, etc. and valves 17, 18, 23, etc. in properly timed sequence, to circuitry 114 which includes other controls and interlocks and to recorder 126. An electronic timing circuit 120 is used to control the timing and switching of infrared sources 57, 58, and 59 via circuitry 121. This switching circuitry is such that the infrared sources are switched "on" and "off" in alternating sequence. The signals generated by detector 62 are representative of the transmitted radiation and are relative to a rating or calibration of zero density when each of cells 51 and 52 contains only water. The infrared source 59, which serves as a reference source to which signals derived from the cells are compared, eliminates measurement errors that might be caused by thermal or fatigue instabilities of the sources and/or detector. The signals derived from detector 62 are shown in FIG. 5 as being connected to a circuit 122 and to a circuit 123 and then to an electronic unit 125 which converts the amount of transmitted radiation incident on the detector 62 to a density factor for use by a recorder 126 that produces the plots 95 and 96 for a visually related display of the measured emulsion densities.

In view of the foregoing description of the tape control and the circuitry associated therewith, this provides means responsive to a predetermined program for controlling the timing and sequence of operation of the various elements comprising the system. Also, the electronic unit (converter) 125 and recorder 126 provide means responsive to a densitometer or measuring means for relating the measured density of the test sample before processing and after processing to each other in the form of a reference density plot and a log exposure vs. density plot.

In the above description of a process and apparatus, the density of a test sample of a liquid emulsion is measured before processing and again after development or processing of the exposed emulsion. When the density measurements are made prior to exposure of the test sample, the measurements are usable in an empirical manner because the emulsion is actually further diluted by the addition of the processing solution after exposure. Density measurements directly related to the measurement after processing with respect to either a silver halide emulsion or a color-forming emulsion can be obtained when such measurements are made after exposure and immediately after the addition of the processing solution but before any chemical action is precipitated; for example, immediately adjacent mixing tee 75 in line 92. Also, with respect to either a silver halide emulsion or a color-forming emulsion, the initial density measurement can be made in line 92 immediately beyond mixing tee 75 while water is being added to the sample by pump 89 in place of the processing or developing solution. This measurement will be of short duration and the electrical signal corresponding to the density measurement will be stored for use at a later time. This initial density measurement relates directly to the density measurements made after processing. In this case, the density measurements after processing can be made on a continuous basis. Likewise, the stored electrical signal corresponding to the initial density measurement (before processing)

can be used to provide a continuous trace, if desired, which will be a constant for its respective test sample. Accordingly, in the broadest sense, the density measurements can be considered as being made both before and after processing and in a more specific sense as being made both before exposure and after processing.

The foregoing description is typical of a test process for measuring the sensitivity of a silver halide emulsion in terms of reduced silver. The process can also be used in the testing of color-forming emulsions by measuring the sensitivity thereof in terms of dye formation. A typical color process can utilize a dye forming reaction in which additional processing chemicals, such as bleach and fixer, are introduced via metering pumps 127 and line 128 to processor coil 91, see FIG. 6. These processing chemicals are mixed with the test sample at a suitable point in the flow path, as shown, to obtain the desired color process. A wide wavelength band energy source, such as a tungsten lamp, is used behind the cell 52 in place of the infrared source 58. However, one or more selected spectral optical filters, a spectrally variable optical filter (such as the Circular Variable Filter manufactured by Optical Coating Laboratories, Inc. Palo Alto, California), or any means which will illuminate the cell with radiation of a preselected wavelength or wavelength region can be interposed between the light source and the cell to measure the emulsion density. When operating the densitometer in this manner, suitable electronic processing of the detector output signals is provided in order to yield spectral transmission density vs. log exposure plots where the density values are measured at a preselected visible light or infrared wavelength region. Dye density plots can be obtained directly in this manner when the process includes a step for bleaching out the metallic silver constituents and fixing out undeveloped silver halide in the sample. Dye densities and metallic silver densities can also be analytically calculated from unbleached, unfixed sample solutions based on the spectral density measurements.

Figure 6:
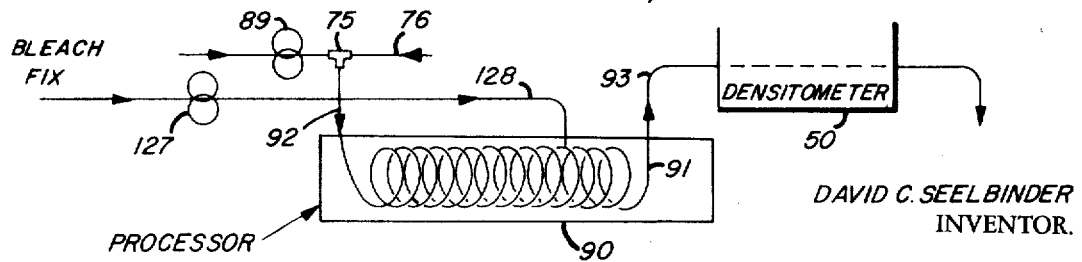
FIG. 6 is a partial schematic view showing a modification of the general arrangement shown in FIG. 1 for measuring the density of a color sensitive emulsion.
Figure 2:
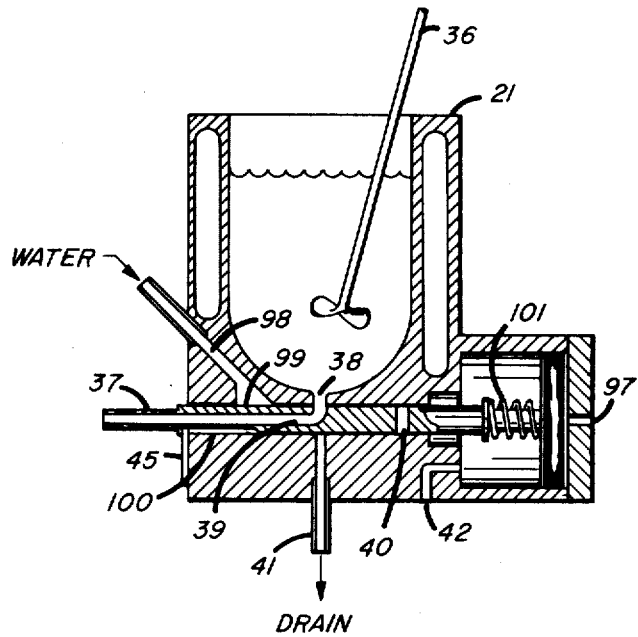
FIG. 2 is a vertical, sectional view through a mixer in which the emulsion is diluted with a quantity of water.
Figure 7:
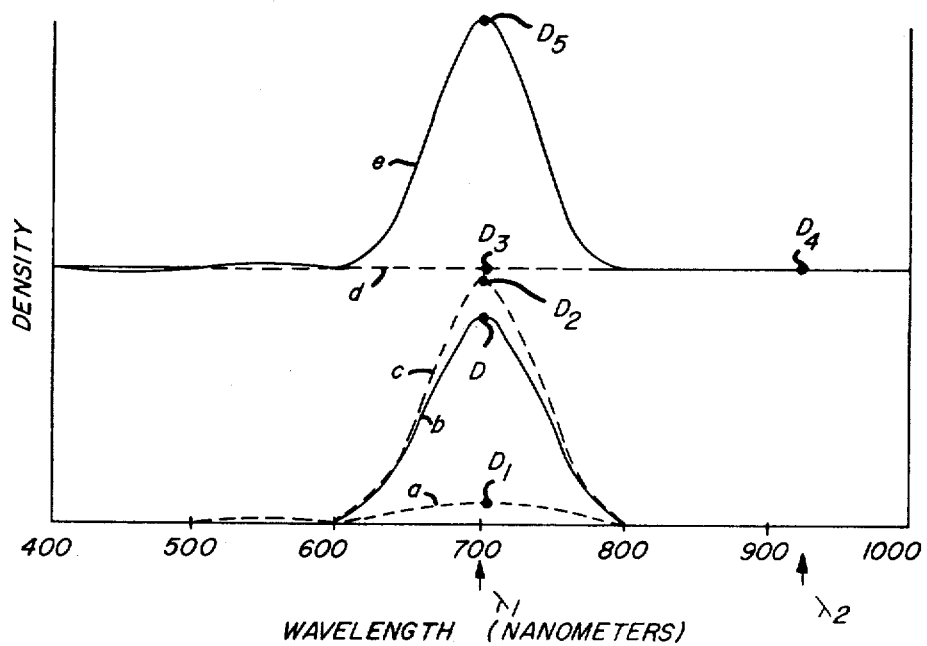
FIG. 7 is a plot of density vs. wavelength showing the spectral characteristics of a processed test sample of a color-forming emulsion.

The description that follows discloses the results that are obtained from a cyan emulsion (color sensitive) at a single exposure level. In a color process during which the processed sample is bleached and fixed, as shown in FIG. 6, the resulting densities, as a function of wavelength, are shown by curve $c$, see FIG. 7. The desired image dye density D is determined by subtracting the density $D_1$ of undesired dyes (Curve $a$) at $\lambda_1$ from the total measured density $D_2$ (Curve $c$) at $\lambda_1$. Wavelength $\lambda_1$ is chosen to obtain optimum sensitivity to image dye formation and is typically the wave-length of peak absorption of the image dye. The density of the unwanted dyes is assumed to be relatively constant and is predetermined from a process which does not involve image dye formation (developer replaced by water). A dye image D versus Log E plot is obtained by plotting the calculated image dye density for a range of exposures.

A process which does not involve bleaching of the reduced silver image is a less complex chemical process, but involves additional density measurements and calculations. Measurements from an unbleached sample are represented by Curve $e$. The total density $D_5$ at $\lambda_1$ is the sum of the image dye density D, the unwanted dye density $D_1$ and the reduced silver density $D_3$. To obtain a value for D, $D_1$ and $D_3$ must be subtracted. $D_3$ is variable with the exposure level and wavelength, but can be determined from infrared measurements ($D_4$) made at $\lambda_2$, where dye images (curves $a$ and $b$) have negligible density. The numerical relationship between $D_3$ and $D_4$ at any given density level is relatively constant for a given emulsion formulation and process condition. This relationship is predetermined from tests of bleached and unbleached samples by comparing $D_4$ to the calculated value of $D_3$ ($D_5$ minus $D_2$). As a result, the image dye density $D = D_5 - D_1 - D_3$ where $D_3 = F(D_4)$.

The term "processing" is meant to describe the step or steps, as well as the solution(s), by which an exposed silver halide emulsion or an exposed color-forming emulsion produces a reduced silver image or a dye image, respectively. In this sense, the term "processing" as used in the disclosed process and system is to be considered as synonomous with developing as generally used particularly with respect to silver halide emulsions.

The term "radiation" as used throughout the specification and claims is meant to include the visible region of the spectrum as well as the infrared and ultraviolet regions. Inasmuch as the process and apparatus described herein can be used for measuring the density of emulsions of different spectral sensitivities, a photosensitive emulsion is considered to be an emulsion sensitive or sensitized to the action of radiant energy and not to only visible light.

This invention has been described in detail with particular reference to preferred embodiments, thereof, but it will be understood that variations and modifications can be effected within the spirit and scope of the invention.

I claim:

1. A continuous process for determining the sensitivity of a liquid, photosensitive emulsion, which comprises the steps of:

exposing a flowing test sample of said emulsion to radiation, the intensity of which varies logarithmically with time;

processing the test sample after exposure;

measuring the optical density of the test sample prior to processing thereof;

measuring the optical density of the test sample subsequent to processing thereof; and relating the measured optical densities of the test sample to each other.

2. A continuous process in accordance with claim 1 wherein the optical density of the test sample prior to processing is measured prior to said exposing step.

3. A continuous process in accordance with claim 1 wherein the optical density of the test sample prior to processing is measured immediately after said exposing step and before said processing step.

4. A continuous process in accordance with claim 1 wherein the optical density of the test sample is measured by the transmittance of radiation having a predetermined frequency range.

5. A continuous process in accordance with claim 1 wherein said emulsion is a silver halide emulsion and the optical density of the test sample is measured, after processing, by the transmittance of infrared radiation.

6. A continuous process in accordance with claim 1 wherein said emulsion is a color-forming emulsion and the optical density of the test sample is measured, after processing, by the transmittance of radiation of a selected color.

7. A continuous process in accordance with claim 1 wherein the optical density of the test sample is measured periodically with respect to time in each measuring step.

8. A continuous process for determining the sensitivity of a liquid, photosensitive emulsion, which comprises the steps of:

moving a test sample of said emulsion continuously through a predetermined flow path;

exposing the test sample to radiation of varying intensity and of a preselected spectral quality;

processing the exposed test sample;

measuring periodically the optical density of the test sample at a first point in said flow path that is upstream relative to said processing step;

measuring periodically the optical density of the test sample at a second point in said flow path that is downstream relative to said processing step; and relating the measured optical densities of the test sample to each other.

9. A continuous process in accordance with claim 8 including the step of mixing and dispersing the test sample in a diluent prior to introducing the test sample into said flow path.

10. A continuous process in accordance with claim 8 wherein the optical density of the test sample is measured in each measuring step by the transmittance of radiation having a predetermined frequency range.

11. A continuous process in accordance with claim 8 wherein said emulsion is a silver halide emulsion and the optical density of the test sample is measured in each measuring step by the transmittance of radiation having a predetermined frequency range.

12. A continuous process in accordance with claim 11 wherein the optical density of the test sample is measured by the transmittance of infrared radiation.

13. A continuous process in accordance with claim 8 wherein said emulsion is a color-forming emulsion and the optical density of the test sample is measured, after the processing step, by the transmittance of selective spectral radiation.

14. A continuous process in accordance with claim 8 wherein the step of relating comprises graphically recording the measured optical densities of the test sample in each measuring step.

15. A continuous process in accordance with claim 13 wherein the optical density of the test sample is measured, after the processing step, by he transmittance of radiation of a color complementary to that of the emulsion.

16. A continuous process in accordance with claim 13 wherein the processing step comprises color processing of the exposed test sample.

17. A continuous process in accordance with claim 8 wherein the exposing step comprises continually varying the intensity of the radiation such that the logarithmic intensity of the radiation varies linearly with time.

18. A continuous system for determining the sensitivity of a liquid, photosensitive emulsion, comprising:

means for continuously moving a test sample of said emulsion through a predetermined flow path;

means arranged in said flow path for exposing the test sample to radiation of continually varying intensity and of a selected spectral quality;

means arranged in said flow path for introducing and mixing a solution with the exposed test sample for processing the same;

first means arranged in said flow path for measuring the optical density of the test sample prior to processing thereof;

second means arranged in said flow path for measuring the optical density of the test sample subsequent to processing thereof;

means responsive to a predetermined program for controlling the timing and sequence of operation of the aforementioned means to provide a cycle of operation; and means responsive to each of said measuring means for relating the measured optical densities of the test sample to each other.

19. A continuous system in accordance with claim 18 including means for introducing and mixing a diluent in the test sample prior to movement of the test sample into said flow path.

20. A continuous system in accordance with claim 18 wherein said first measuring means comprises a photosensitive detector arranged relative to one side of and in spaced relation to a first transparent cell through which the unprocessed test sample flows, and said second measuring means comprises said same photosensitive detector arranged relative to one side of and in spaced relation to a second transparent cell through which the processed test sample flows, the other side of each of said first and second cells having a respective source of radiation of predetermined wavelength range incident thereon, and including a discrete source of reference radiation of said predetermined wavelength range arranged relative to said photosensitive detector.

21. A continuous system in accordance with claim 20 wherein said controlling means includes switching means for cyclically energizing each source of radiation, whereby said detector generates a repetitive series of electrical signals from said reference source and from the radiation transmitted by the test sample in each cell.

22. A continuous system in accordance with claim 21 including means responsive to the series of signals generated by said detector for recording the measured optical densities of the test sample as continuous graphic representations.

23. A continuous system in accordance with claim 18 wherein said exposing means comprises a source of radiation aligned with a portion of the flow path of the test sample and means arranged between said portion of the flow path and said source of radiation for continually varying the intensity of the radiation incident on the test sample.

24. A continuous system in accordance with claim 23 wherein said intensity varying means comprises a rotatable, spectrally neutral filter, the radiation transmittance factor of which varies with rotation so the logarithmic intensity varies linearly with time.

25. A continuous system in accordance with claim 24 wherein said intensity varying means includes a plurality of filters, each of a different spectral quality and selectively alignable with said source of radiation, and a plurality of radiation attenuators, each of which has a different radiation transmittance factor and is selectively alignable with said source of radiation.

26. A continuous system in accordance with claim 18 wherein said emulsion is a silver halide emulsion, said processing solution chemically reduces the exposed test sample to metallic silver, and said system including means for irradiating the test sample both before and after processing thereof with infrared radiation for measuring the optical density thereof.

27. A continuous system in accordance with claim 18 wherein said emulsion is a color-forming emulsion, said processing solution reacts the exposed test sample to form a dye and said system including means for subjecting the exposed test sample, after processing, to visible light complementary in color to said dye for measuring the optical density of the exposed and processed test sample.

* * * * *